United States Patent
Ozawa et al.

(10) Patent No.: US 12,358,395 B2
(45) Date of Patent: Jul. 15, 2025

(54) POWER MANAGEMENT SYSTEM, SERVER, AND METHOD OF ADJUSTING POWER DEMAND AND SUPPLY

(71) Applicant: TOYOTA JIDOSHA KABUSHIKI KAISHA, Toyota (JP)

(72) Inventors: Tamaki Ozawa, Toyota (JP); Tohru Nakamura, Toyota (JP); Akinori Morishima, Naka-gun (JP); Yusuke Horii, Nagoya (JP); Wataru Matsumura, Ichihara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 692 days.

(21) Appl. No.: 17/728,125

(22) Filed: Apr. 25, 2022

(65) Prior Publication Data
US 2022/0396171 A1    Dec. 15, 2022

(30) Foreign Application Priority Data

Jun. 9, 2021 (JP) .................................. 2021-096436

(51) Int. Cl.
*B60L 53/66* (2019.01)
*B60L 53/63* (2019.01)
(Continued)

(52) U.S. Cl.
CPC .............. *B60L 53/665* (2019.02); *B60L 53/63* (2019.02); *H02J 3/322* (2020.01); *B60L 55/00* (2019.02);
(Continued)

(58) Field of Classification Search
CPC ........ B60L 53/665; B60L 53/63; B60L 55/00; B60L 53/51; B60L 53/64; H02J 3/322;
(Continued)

(56) References Cited

U.S. PATENT DOCUMENTS

2014/0039709 A1   2/2014   Steven et al.
2015/0046222 A1   2/2015   Ishii
(Continued)

FOREIGN PATENT DOCUMENTS

| JP | 2017-147912 A | 8/2017 |
|---|---|---|
| WO | WO 2013/115318 A1 | 8/2013 |
| WO | WO 2019/130930 A1 | 7/2019 |

OTHER PUBLICATIONS

Smart Energy Systems, GSM Association, GSMA Floor2, The Walbrook Building, 25 Walbrook, London, UK, Feb. 12, 2021.

*Primary Examiner* — Paul Dinh
(74) *Attorney, Agent, or Firm* — Finnegan, Henderson, Farabow, Garrett, and Dunner, LLP

(57) ABSTRACT

A power management system includes a plurality of power adjustment resources electrically connected to a microgrid MG, and a CEMS server that manages the power adjustment resources. The CEMS server outputs a power adjustment request to the power adjustment resources when suppression of power consumption or consumption of surplus power in the microgrid MG is requested, and gives an incentive to a "responding resource" as the power adjustment resource that performs power adjustment in response to the power adjustment request among the power adjustment resources. The CEMS server increases the incentive more as a deviation of a time period during which the power adjustment is performed by the responding resource, with respect to a time period determined in the power adjustment request is smaller.

9 Claims, 5 Drawing Sheets

(51) Int. Cl.
*H02J 3/32* (2006.01)
*B60L 55/00* (2019.01)

(52) U.S. Cl.
CPC ....... *H02J 2310/48* (2020.01); *H02J 2310/64* (2020.01)

(58) Field of Classification Search
CPC .............. H02J 2310/48; H02J 2310/64; H02J 2300/20; H02J 2300/40; H02J 1/106; H02J 1/14; H02J 3/008; H02J 3/06; H02J 3/144; H02J 3/38; H02J 3/003; G06Q 50/06
USPC ....................................................... 320/109
See application file for complete search history.

(56) References Cited

U.S. PATENT DOCUMENTS

| | | | | |
|---|---|---|---|---|
| 2016/0276832 A1* | 9/2016 | Kawai | ............... | H02J 13/00001 |
| 2017/0343973 A1* | 11/2017 | Kitaji | ..................... | H02J 3/144 |
| 2020/0317075 A1 | 10/2020 | Yokoyama et al. | | |
| 2020/0403419 A1* | 12/2020 | Yokoyama | ......... | G06Q 30/0207 |
| 2021/0129689 A1 | 5/2021 | Nakamura et al. | | |

\* cited by examiner

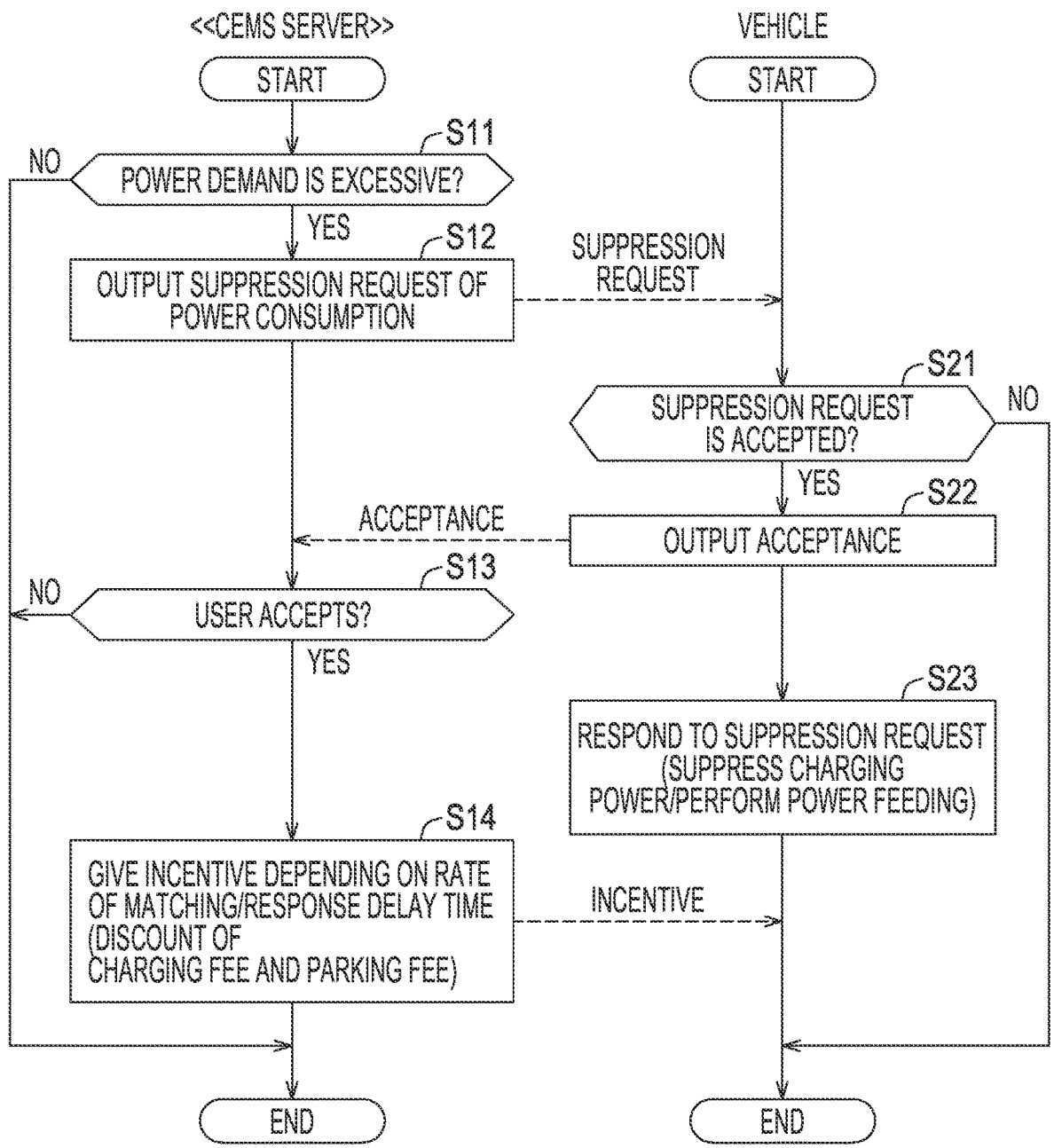

POWER MANAGEMENT SYSTEM, SERVER, AND METHOD OF ADJUSTING POWER DEMAND AND SUPPLY

CROSS-REFERENCE TO RELATED APPLICATION

This application claims priority to Japanese Patent Application No. 2021-096436 filed on Jun. 9, 2021, incorporated herein by reference in its entirety.

BACKGROUND

1. Technical Field

The present disclosure relates to a power management system, a server, and a method of adjusting power demand and supply.

2. Description of Related Art

WO 2013/115318 discloses a power demand and supply adjustment system capable of providing incentive information effective in adjusting power demand and supply to a user.

SUMMARY

A plurality of power adjustment resources (power generators, variable renewable energy sources, power storage systems, charging facilities, vehicles, and the like) is electrically connected to a power network, such as a microgrid. In a case where a request for performing power adjustment of the power network is output from a server to each power adjustment resource, a part of power adjustment resources normally performs the power adjustment in response to the request. Even though there is a power adjustment resource that can respond to the request in this way, when the response does not sufficiently conform to the request, appropriate power adjustment may not be performed.

The present disclosure is to more reliably perform power adjustment of a power network.

A first aspect of the present disclosure relates to a power management system including a plurality of power adjustment resources and a server. The power adjustment resources are electrically connected to a power network. The server is configured to manage the power adjustment resources. The server is configured to output a power adjustment request to the power adjustment resources when suppression of power consumption or consumption of surplus power in the power network is requested, and give an incentive to a responding resource as the power adjustment resource that performs power adjustment in response to the power adjustment request among the power adjustment resources. The server is configured to increase the incentive more as a deviation of a time period during which the power adjustment is performed by the responding resource, with respect to a time period determined in the power adjustment request is smaller.

In the first aspect, the server may be configured to increase the incentive more as a rate of matching between the time period determined in the power adjustment request and the time period during which the power adjustment is performed by the responding resource is higher.

In the first aspect, the server may be configured to increase the incentive more as a response delay time of the responding resource to the power adjustment request is shorter.

In the aspect, when suppression of power consumption or consumption of surplus power in the power network is requested, the power adjustment request is output from the server to the responding resource. A user (owner, manager, or the like) of the responding resource determines whether or not to accept the power adjustment request. In this case, as the deviation of the time period during which the power adjustment is performed by the responding resource, with respect to the time period determined in the power adjustment request is smaller (as the time periods match each other), a greater incentive (for example, fee discount) is given to the user. Accordingly, the user who wants to obtain as a large incentive as possible accepts (for example, quickly accepts) the power adjustment sufficiently taking the time period determined in the power adjustment request into account. Therefore, it is possible to more reliably perform the power adjustment of the power network.

In the first aspect, the responding resource may include a vehicle configured to be charged with supply power from the power network. The incentive may include a charging fee from the power network to the vehicle. The server may set the charging fee to be lower as the response delay time is shorter.

In the first aspect, the responding resource may include a vehicle configured to perform power feeding to the power network. The incentive may include a power feeding fee from the vehicle to the power network. The server may set the power feeding fee to be higher as the response delay time is shorter.

In the first aspect, the responding resource may include a vehicle configured to send and receive power to and from the power network. The incentive may include a parking fee for a parking space where the vehicle parks to send and receive the power to and from the power network. The server may set the parking fee to be lower as the response delay time is shorter.

According to the aspect, it is possible to give an incentive that motivates a user of the vehicle to respond to the power adjustment request.

A second aspect of the present disclosure relates to a server configured to manage a plurality of power adjustment resources for use in adjusting supply power from a power system to a power network. The server includes a processor, and a memory that stores a program executable by the processor. The processor is configured to output a power adjustment request to the power adjustment resources when suppression of power consumption or consumption of surplus power in the power network is requested, and give an incentive to a responding resource as the power adjustment resource that performs power adjustment in response to the power adjustment request among the power adjustment resources. The processor is configured to increase the incentive more as a deviation of a time period during which the power adjustment is performed by the responding resource, with respect to a time period determined in the power adjustment request is smaller.

According to the second aspect, as in the first aspect, it is possible to more reliably perform the power adjustment of the power network.

A third aspect of the present disclosure relates to a method of adjusting power demand and supply that manages a plurality of power adjustment resources for use in adjusting supply power from a power system to a power network. The method of adjusting power demand and supply includes outputting a power adjustment request to the power adjustment resources when suppression of power consumption or consumption of surplus power in the power network is requested, giving an incentive to a responding resource as the power adjustment resource that performs power adjustment in response to the power adjustment request among the power adjustment resources, and increasing the incentive more as a deviation of a time period during which the power adjustment is performed by the responding resource, with respect to a time period determined in the power adjustment request is smaller.

According to the third aspect, as in the first aspect, it is possible to more reliably perform the power adjustment of the power network.

According to the present disclosure, it is possible to more reliably perform the power adjustment of the power network.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a flowchart illustrating processing related to setting of an incentive in the embodiment.

DETAILED DESCRIPTION OF EMBODIMENTS

Figure 1:
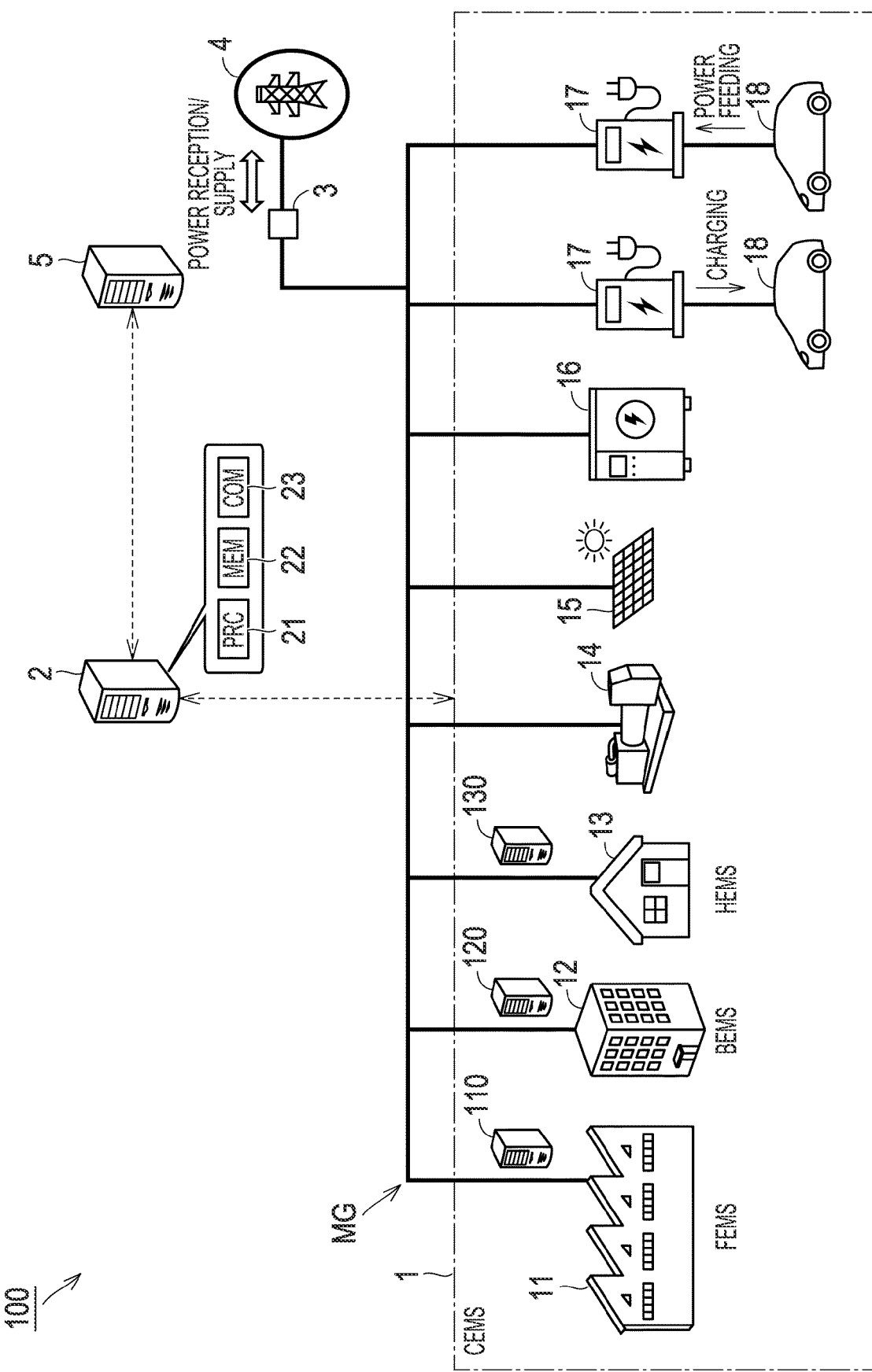
FIG. 1 is a diagram showing the schematic configuration of a power management system according to an embodiment of the present disclosure.

Hereinafter, an embodiment of the present disclosure will be described in detail referring to the drawings. The same or corresponding portions in the drawings are represented by the same reference numerals and description thereof will not be repeated.

Embodiment

Overall Configuration of Power Management System

FIG. 1 is a diagram showing the schematic configuration of a power management system according to the embodiment of the present disclosure. A power management system 100 includes a CEMS 1, a CEMS server 2, a power receiving and transforming facility 3, a power system 4, and a power transmission and distribution service provider server 5. The CEMS means a community energy management system or a city energy management system.

The CEMS 1 includes a factory energy management system (FEMS) 11, a building energy management system (BEMS) 12, a home energy management system (HEMS) 13, a power generator 14, a variable renewable energy source 15, a power storage system (Energy Storage System (ESS)) 16, charging facilities (Electric Vehicle Supply Equipment (EVSE)) 17, and vehicles 18. In the CEMS 1, a microgrid MG is constructed by such constituent elements. The microgrid MG can be regarded as an example of a "power network" according to the present disclosure.

The FEMS 11 is a system that manages demand and supply of power used in factories. The FEMS 11 includes factory buildings (including lighting equipment, air conditioning equipment, and the like) and industrial facilities (production lines and the like) that operate with power supplied from the microgrid MG. Though not shown, the FEMS 11 can include power generation facilities (power generators, solar panels, and the like) provided in factories. Power generated by such power generation facilities may be supplied to the microgrid MG. The FEMS 11 further includes an FEMS server 110 that can perform two-way communication with the CEMS server 2.

The BEMS 12 is a system that manages demand and supply of power used in buildings, such as offices or commercial facilities. The BEMS 12 includes lighting equipment and air conditioning equipment provided in buildings. The BEMS 12 may include power generation facilities (solar panels and the like) or may include cold and heat source systems (waste heat recovery systems, heat storage systems, and the like). The BEMS 12 further includes a BEMS server 120 that can perform two-way communication with the CEMS server 2.

The HEMS 13 is a system that manages demand and supply of power used in a home. The HEMS 13 includes household appliances (lighting equipment, air conditioning equipment, and other appliances) that operate with power supplied from the microgrid MG. The HEMS 13 may include solar panels, household heat pump systems, household cogeneration systems, household storage batteries, and the like. The HEMS 13 further includes an HEMS server 130 that can perform two-way communication with the CEMS server 2.

The power generator 14 is a power generation facility that does not depend on weather conditions, and outputs generated power to the microgrid MG. The power generator 14 includes a steam turbine power generator, a gas turbine power generator, a diesel engine power generator, a gas engine power generator, a biomass power generator, a stationary fuel cell, or the like. The power generator 14 may include a cogeneration system that utilizes heat generated at the time of power generation.

The variable renewable energy source 15 is a power generation facility the power generation output of which varies depending on weather conditions, and output generated power to the microgrid MG. Although a solar power generation facility (solar panel) is shown in FIG. 1, the variable renewable energy source 15 may include a wind power generation facility instead of or in addition to the solar power generation facility.

The power storage system 16 is a stationary power source that stores power generated by the variable renewable energy source 15 and the like. The power storage system 16 is a secondary battery, and for example, is a lithium-ion battery or a nickel-hydrogen battery of a battery (recycling product) used in a vehicle. Note that the power storage system 16 is not limited to the secondary battery, and may be power to gas equipment that produces gaseous fuel (hydrogen, methane, and the like) using surplus power.

The charging facilities 17 are electrically connected to the microgrid MG, and are configured to be charged with power from and to discharge power (perform power feeding) to the microgrid MG.

The vehicles 18 are specifically plug-in hybrid electric vehicles (PHEV), battery electric vehicles (BEV), and the like. Each vehicle 18 is configured to perform one or both of external charging and external power feeding. That is, the vehicle 18 is configured such that power is supplied from the microgrid MG to the vehicle 18 when a charging cable is connected to an inlet (not shown) of the vehicle 18 (external charging). The vehicle 18 may be configured such that power is supplied from the vehicle 18 to the microgrid MG when the charging cable is connected to an outlet (not shown) of the vehicle 18 (external power feeding).

In an example shown in FIG. 1, although the number of FEMSs 11, the number of BEMSs 12, the number of HEMSs 13, the number of power generators 14, the number of variable renewable energy sources 15, and the number of power storage systems 16 included in the CEMS 1 are one, the number of such systems or facilities is optional. The CEMS 1 may include a plurality of such systems or facilities or systems or facilities not included in the CEMS 1 may be provided. Since each of the FEMS 11 (factory buildings, industrial facilities, and the like), the BEMS 12 (lighting equipment, air conditioning equipment, and the like), the HEMS 13 (household appliances and the like), the power generator 14, the variable renewable energy source 15, the power storage system 16, the charging facilities 17, and the vehicles 18 included in the CEMS 1 can be regarded as a "power adjustment resource" according to the present disclosure, such systems or facilities are hereinafter described as "power adjustment resources" unless such systems or facilities are to be not particularly distinguished from one another.

The CEMS server 2 is a computer that manages the power adjustment resources in the CEMS 1. The CEMS server 2 includes a control device 21, a storage device 22, and a communication device 23. The control device 21 includes a processor and is configured to execute predetermined arithmetic processing. The storage device 22 includes a memory that stores a program to be executed by the control device 21, and stores various kinds of information (maps, relational expressions, parameters, and the like) for use in the program. The communication device 23 includes a communication interface and is configured to perform communication with the outside (another server and the like).

The CEMS server 2 may be an aggregator server. An aggregator is an electric utility that provides an energy management service by putting together a plurality of power adjustment resources. The CEMS server 2 can be regarded as a "server" according to the present disclosure. A server 110, 120, 130 included in each system of the FEMS 11, the BEMS 12, and the HEMS 13 can also be regarded as a "server" according to the present disclosure.

The power receiving and transforming facility 3 is provided at a connection point (power receiving point) of the microgrid MG and is configured to be switchable between parallel (connection)/parallel-off (disconnection) of the microgrid MG and the power system 4. The power receiving and transforming facility 3 includes a high-voltage side (primary) opening and closing device, a transformer, a protection relay, measuring equipment, and a control device (all are not shown). When the microgrid MG is connected with the power system 4, the power receiving and transforming facility 3 receives alternating-current power of, for example, an extra-high voltage (a voltage exceeding 7000 V) from the power system 4, steps down the received power, and supplies power to the microgrid MG.

The power system 4 is a power network constructed by a power station and a power transmission and distribution facility. In the embodiment, a power company serves as a power generation service provider and a power transmission and distribution service provider. The power company corresponds to a general power transmission and distribution service provider and corresponds to a manager of the power system 4, and maintains and manages the power system 4.

The power transmission and distribution service provider server 5 is a computer that belongs to the power company and manages power demand and supply of the power system 4. The power transmission and distribution service provider server 5 is also configured to perform two-way communication with the CEMS server 2.

Mismatch with Power Adjustment Request

In the CEMS 1, a supply power amount from the power system 4 to the microgrid MG in each predetermined period is planned conforming to a contract concluded between a manager of the CEMS 1 and a power company. A typical period is 30 minutes. To stabilize power of the power system 4, there is a need to substantially match the planned supply power amount with an actual supply power amount every 30 minutes. This control is called "30-minute balancing". The present inventors have focused that a mismatch (response delay or the like) of power adjustment in terms of time, for example, in realizing the 30-minute balancing or the like may become a problem.

Figure 2:
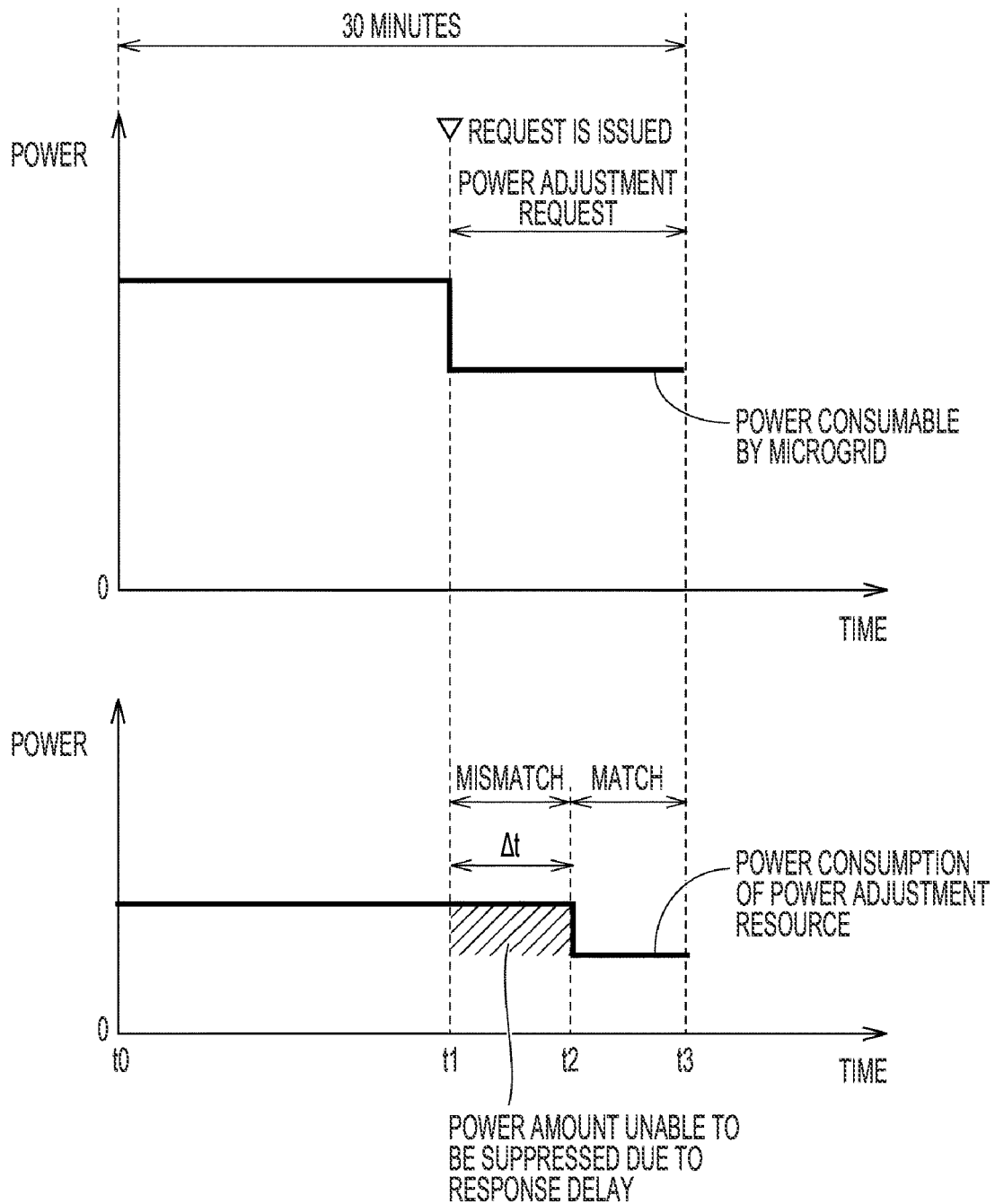
FIG. 2 is a time chart illustrating an example of a mismatch of power adjustment in terms of time.

FIG. 2 is a time chart illustrating an example of a mismatch of power adjustment in terms of time. The horizontal axis represents an elapsed time. Initial time t0 is a start time of a 30-minute time frame. Time t3 is an end time of the 30-minute time frame. The vertical axis represents power. Here, an example where the CEMS server 2 outputs a request (suppression request) for suppressing power consumption in the microgrid MG is output to realize the 30-minute balancing will be described.

At time t1, the suppression request of power consumption is issued. In this example, a situation in which suppression of power consumption in the microgrid MG is requested in a period from time t1 to time t3 is assumed. The CEMS server 2 outputs the suppression request to each of the power adjustment resources in the CEMS 1. A certain power adjustment resource (a "responding resource" according to the present disclosure) among the power adjustment resources responds to the suppression request at time t2 and suppresses power consumption compared to before responding to the suppression request.

It is desirable that, as the power adjustment resource more quickly responds to the suppression request, the power adjustment resource performs power adjustment conforming to the time period determined in the suppression request. Note that the power adjustment resource is not necessarily to instantly respond to the suppression request, and the response (a start of actual suppression of power consumption) to the suppression request may be delayed. When the response to the suppression request is delayed, time elapses while the power consumption of the power adjustment resource remains unsuppressed. For this reason, power is consumed as before (in the drawing, hatched portion), and a remaining time for realizing the 30-minute balancing is shortened by a time for the delay. As a result, the 30-minute balancing may be hardly realized in the CEMS 1. Then, a situation in which stabilization of power of the power system 4 is not kept is also assumed. Though not shown herein, the power adjustment resource may continue the power adjustment even after an end time determined in the suppression request.

Accordingly, in the embodiment, a configuration is employed in which, as a deviation of a time period during which the power adjustment is performed by the power adjustment resource, with respect to the time period determined in the suppression request is smaller, a greater incentive is given from the CEMS server 2 to the power adjustment resource. In an example of FIG. 2, as the power adjustment resource more quickly responds to the suppression request, a greater incentive is given.

In the embodiment, as an index for quantifying the deviation between the two time periods, for example, a "rate of matching" is employed. The rate of matching is a rate of matching between the time period (in FIG. 2, a period of time t1 to time t3) determined in the suppression request and the time period (a period of time t2 to time t3) during which the power adjustment is performed by the power adjustment resource. Alternatively, a "response delay time Δt" that is a time for which the response to the suppression request is delayed may be employed as the index.

Incentive

Figure 3:
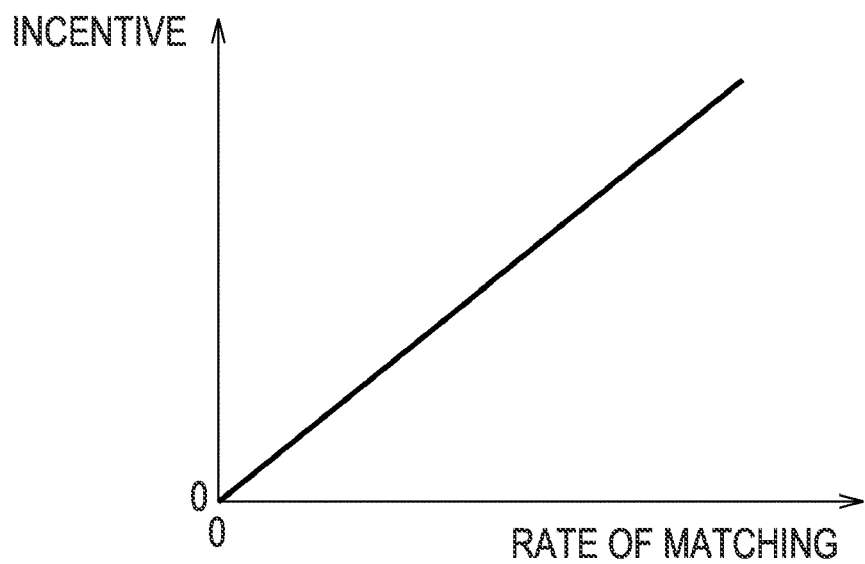
FIG. 3 is a diagram showing a first example of a setting method of an incentive depending on a rate of matching.
Figure 4:
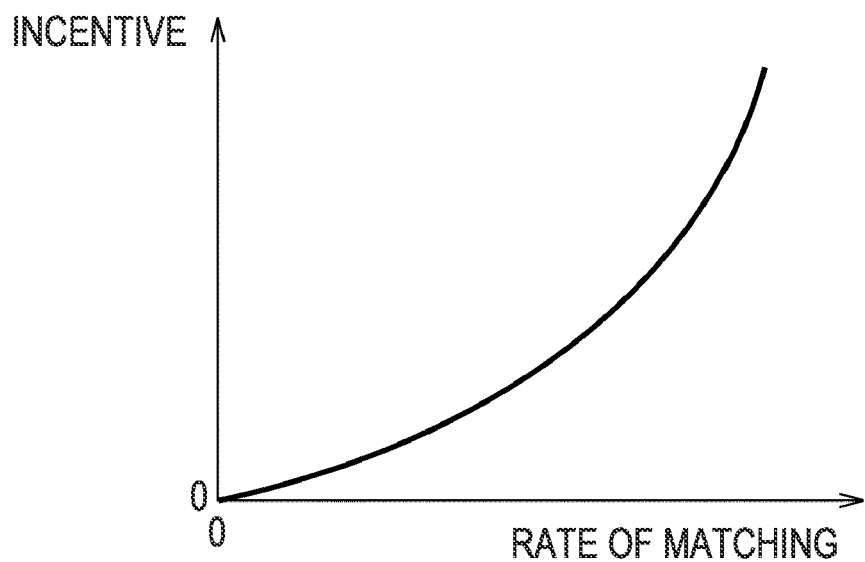
FIG. 4 is a diagram showing a second example of a setting method of an incentive depending on a rate of matching.
Figure 5:
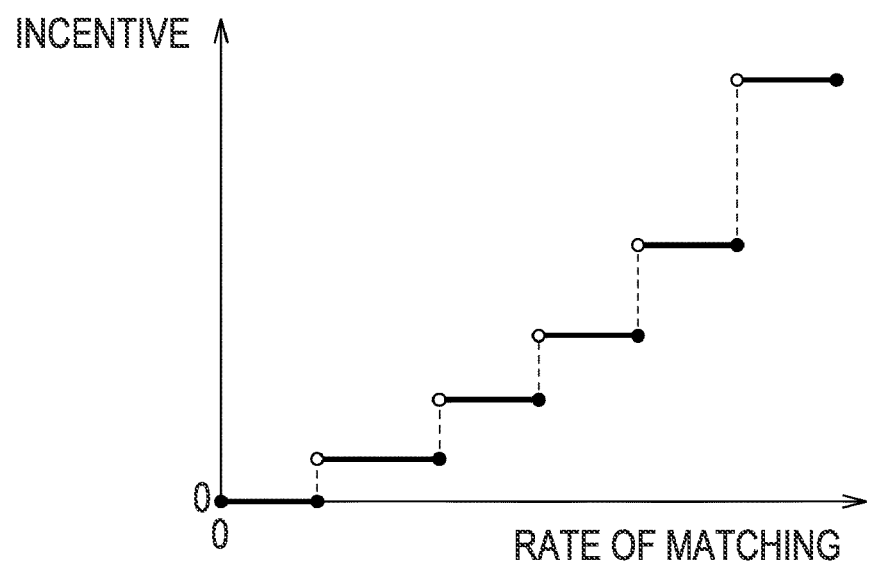
FIG. 5 is a diagram showing a third example of a setting method of an incentive depending on a rate of matching.

FIG. 3 is a diagram showing a first example of a setting method of an incentive depending on the rate of matching. FIG. 4 is a diagram showing a second example of a setting method of an incentive depending on a rate of matching. FIG. 5 is a diagram showing a third example of a setting method of an incentive depending on a rate of matching. The horizontal axis represents a rate of matching. The vertical axis represents an incentive that is given from the CEMS server 2 to the power adjustment resource.

In the embodiment, as the rate of matching is higher, the incentive is determined to be greater. A relationship between the rate of matching and the incentive is, for example, a linear relationship shown in FIG. 3. Note that the relationship is not limited thereto, and may be a curved relationship (see FIG. 4) or may be a stepwise relationship (see FIG. 5).

Figure 6:
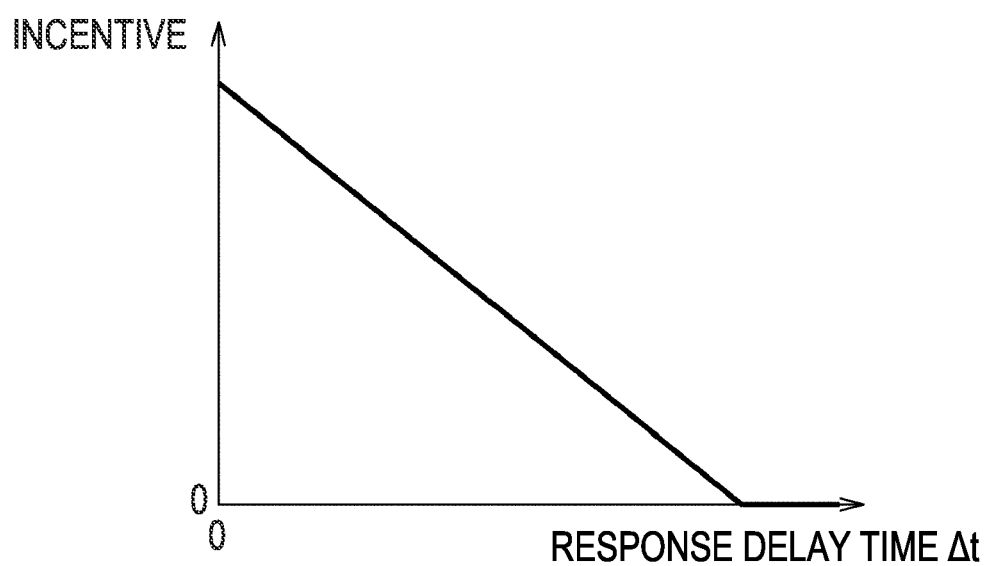
FIG. 6 is a diagram showing an example of a setting method of an incentive depending on a response delay time.

FIG. 6 is a diagram showing an example of a setting method of an incentive depending on the response delay time Δt. The horizontal axis represents the response delay time Δt, and the vertical axis represents the incentive. When the response delay time Δt is employed, as the response delay time Δt is shorter, the incentive is determined to be greater. Though not shown, a relationship between the response delay time Δt and the incentive may be a curved relationship or may be a stepwise relationship.

The magnitude of the incentive is defined by, for example, a fee. Specifically, a greater incentive means that, for example, an electric charge to be paid by a user (owner) of a power adjustment resource in the CEMS 1 is lower. As an example, when the power adjustment resource is the vehicle 18, as the incentive is greater, a charging fee to the vehicle 18 in external charging is lower. Alternatively, a greater incentive means that a power sale charge to be received by the user is higher. When the power adjustment resource is the vehicle 18, as the incentive is greater, a power feeding fee from the vehicle 18 in external power feeding is higher. The incentive may be a parking fee of the vehicle 18 at the time of external charging or at the time of external power feeding.

In this way, the incentive depending on the rate of matching and/or the response delay time Δt is introduced, whereby it is possible to reduce a response time of the power adjustment resource to the suppression request or to secure a sufficiently long period for which power consumption is suppressed. As a result, it is possible to more reliably perform power adjustment in the microgrid MG or to observe a contract between the CEMS 1 and the power company.

Processing Flow

Even in the following description, a configuration in which the vehicle 18 is used as a power adjustment resource will be described as an example. In this example, the power adjustment of the microgrid MG is performed by suppressing charging power from the microgrid MG to the vehicle 18 through the charging facility 17 (performing power feeding from the vehicle 18 to the microgrid MG through the charging facility 17.

FIG. 7 is a flowchart illustrating processing related to setting of an incentive in the embodiment. The flowchart is called from a main routine (not shown) and executed each time a predetermined condition is established or in each predetermined cycle. In FIG. 7, a series of processing that is executed by the CEMS server 2 is shown on a left side, and a series of processing that is executed by the vehicle 18 is shown on a right side. Although each step is realized by software processing with the CEMS server 2 or an electronic control unit (ECU) of the vehicle 18, each step may be realized by hardware (electric circuits) in the CEMS server 2 or the vehicle 18. Hereinafter, Step is abbreviated as S.

In S11, the CEMS server 2 determines whether or not the occurrence of a situation in which power demand of the microgrid MG is excessive is predicted. For example, the CEMS server 2 can determine that the situation in which power demand is excessive may occur when a ratio (or a difference) of an actual supply power amount to a supply power amount planned in 30-minute balancing exceeds a predetermined value. Alternatively, the CEMS server 2 may determine that the situation in which power demand is excessive may occur when a ratio of total power consumption of the power adjustment resources in the microgrid MG to supply power from the power system 4 to the microgrid MG is predicted to be higher than a predetermined value based on past power consumption records.

When the situation in which power demand is excessive does not occur (in S11, NO), subsequent processing is not executed, and the process returns to the main routine. When the situation in which power demand is excessive may occur (in S11, YES), the CEMS server 2 requests various power adjustment resources including the vehicle 18 to suppress power consumption (S12).

The vehicle 18 that receives the suppression request responds whether or not the suppression request can be accepted (S21). For example, when the user performs an operation indicating that the suppression request can be accepted, on a human machine interface (HMI) of the vehicle 18 or a user terminal, such as a smartphone, (both are not shown), the vehicle 18 can respond that the suppression request can be accepted. When the user does not accept the suppression request (in S21, NO), the vehicle 18 returns the process to the main routine. When the suppression request is accepted (in S21, YES), the vehicle 18 outputs the acceptance to the CEMS server 2 (S22).

In S23, the vehicle 18 responds to the suppression request. That is, the vehicle 18 suppresses the charging power from the microgrid MG to the vehicle 18 compared to before the suppression request is accepted. Specifically, the charging power to the vehicle 18 may be set to be lower by a predetermined amount or at a predetermined rate or charging to the vehicle 18 may be postponed until a predetermined time elapses. The charging to the vehicle 18 may be suspended. Alternatively, on the contrary, power feeding from the vehicle 18 to the microgrid MG may be performed.

When the user of the vehicle 18 accepts the suppression request (in S13, YES), the CEMS server 2 gives an incentive depending on a degree of matching between the time period determined in the suppression request and the time period during which the power adjustment is actually performed, to the vehicle 18 (S14). As described in FIGS. 3 to 6, the incentive is set to be greater as the rate of matching is higher and/or as the response delay time Δt is shorter.

As described above, in the embodiment, when the situation in which power demand is excessive is predicted, the suppression request of power consumption is output from the CEMS server 2 to the vehicle 18. The user of the vehicle 18 determines whether or not to accept the suppression request. In this case, as the user accepts the suppression request as the time determined in the suppression request, a large incentive (a discount of a charging fee, an increase of a power feeding fee, a discount of a parking fee, or the like) is given to the user. Accordingly, since the user who wants to obtain as a large incentive as possible quickly accepts the suppression request, a time (response delay time Δt) until charging power to the vehicle 18 is suppressed or feeding power from the vehicle 18 increases is reduced. Since the user suppresses power consumption following the time period determined in the suppression request, charging power to the vehicle 18 is suppressed or feeding power from the vehicle 18 increases for a sufficiently long time. Therefore, according to the embodiment, it is possible to more reliably realize 30-minute balancing and to maintain power balance of the microgrid MG.

In this example, a case where, when the occurrence of the situation in which power demand in the microgrid MG is excessive is predicted, the incentive depending on the response delay time Δt is given has been described. Similarly, even when the situation in which power demand is excessive already occurs, it is possible to give an incentive depending on the rate of matching and/or the response delay time Δt. Although an example where power consumption in the microgrid MG is suppressed has been described in FIGS. 2 and 7, the CEMS server 2 can set an incentive variable similarly even when consumption of surplus power of the power system 4 increases in the microgrid MG.

The embodiment disclosed herein is to be considered merely illustrative and not restrictive in all respects. The scope of the present disclosure is defined by the claims, rather than the above description of the embodiment, and is intended to include all modifications within the scope and meaning equivalent to the claims.

What is claimed is:

1. A power management system comprising:
    a plurality of power adjustment resources electrically connected to a power network; and
    a server configured to
        manage the power adjustment resources,
        output a power adjustment request to the power adjustment resources in response to a request for suppression of power consumption or consumption of surplus power in the power network,
        give an incentive to a responding resource that performs power adjustment in response to the power adjustment request among the power adjustment resources, and
        increase the incentive more as a response delay time is shorter, the response delay time being the time elapsed from output of the power adjustment request to the start of power adjustment by the responding resource.

2. The power management system according to claim 1, wherein:
    the responding resource includes a vehicle configured to be charged with supply power from the power network; and
    the incentive includes a charging fee from the power network to the vehicle.

3. The power management system according to claim 1, wherein:
    the responding resource includes a vehicle configured to perform power feeding to the power network; and
    the incentive includes a power feeding fee from the vehicle to the power network.

4. The power management system according to claim 1, wherein:
    the responding resource includes a vehicle configured to send and receive power to and from the power network; and
    the incentive includes a parking fee for a parking space where the vehicle parks to send and receive the power to and from the power network.

5. The power management system according to claim 1, wherein the responding resource that receives the power adjustment request is configured to:
    output an acceptance to the server in a case where the power adjustment request is accepted, and
    start the power adjustment after outputting the acceptance.

6. A server configured to manage a plurality of power adjustment resources for use in adjusting supply power from a power system to a power network, the server comprising:
    a processor; and
    a memory that stores a program executable by the processor,
    wherein the processor is configured to
        output a power adjustment request to the power adjustment resources in response to a request for suppression of power consumption or consumption of surplus power in the power network,
        give an incentive to a responding resource that performs power adjustment in response to the power adjustment request among the power adjustment resources, and
        increase the incentive more as a response delay time is shorter, the response delay time being the time elapsed from output of the power adjustment request to the start of power adjustment by the responding resource.

7. The server according to claim 6, wherein the server is configured to receive an acceptance from the responding resource indicating the power adjustment request is accepted, and the power adjustment is started after the server received the acceptance.

8. A method of adjusting power demand and supply that manages a plurality of power adjustment resources for use in adjusting supply power from a power system to a power network, the method comprising:
    outputting a power adjustment request to the power adjustment resources in response to a request for suppression of power consumption or consumption of surplus power in the power network;
    giving an incentive to a responding resource that performs power adjustment in response to the power adjustment request among the power adjustment resources; and
    increasing the incentive more as a response delay time is shorter, the response delay time being the time elapsed from output of the power adjustment request to the start of power adjustment by the responding resource.

9. The method according to claim 8 further comprising:
    receiving an acceptance from the responding resource indicating the power adjustment request is accepted; and
    starting the power adjustment in response to receive the acceptance.

* * * * *